US008352115B2

(12) United States Patent
Mathieson et al.

(10) Patent No.: US 8,352,115 B2
(45) Date of Patent: Jan. 8, 2013

(54) METHODS AND APPARATUS FOR INITIATING SERVICE SESSIONS BETWEEN VEHICLES AND SERVICE PROVIDERS

(75) Inventors: Kier M. Mathieson, Grosse Pointe Farms, MI (US); John J. Flood, IV, Canton, MI (US); Jason D. York, Nolensville, TN (US)

(73) Assignee: GM Global Technology Operations LLC, Detroit, MI (US)

( * ) Notice: Subject to any disclaimer, the term of this patent is extended or adjusted under 35 U.S.C. 154(b) by 710 days.

(21) Appl. No.: 12/495,232

(22) Filed: Jun. 30, 2009

(65) Prior Publication Data

US 2010/0332073 A1 Dec. 30, 2010

(51) Int. Cl.
*G06F 19/00* (2006.01)

(52) U.S. Cl. ...................................... 701/29.1; 701/29.6

(58) Field of Classification Search ................. 701/29.4, 701/29.6, 31.4–31.8, 29.1, 36; 340/425.5, 340/438–439; 702/182–185
See application file for complete search history.

(56) References Cited

U.S. PATENT DOCUMENTS 6,028,537 A * 2/2000 Suman et al. ................. 340/988
6,330,499 B1 * 12/2001 Chou et al. ................... 701/31.4
6,542,076 B1 * 4/2003 Joao ......................... 340/539.14
2003/0120420 A1 * 6/2003 D'Amico et al. ............. 701/200
2005/0096939 A1 5/2005 Ramseyer
2005/0159988 A1 7/2005 Ramseyer
2008/0015908 A1 1/2008 Ramseyer
2008/0103806 A1 * 5/2008 Harris ............................... 705/1
2008/0133432 A1 6/2008 Ramseyer
2008/0204191 A1 8/2008 Alrabady

OTHER PUBLICATIONS

Ramseyer, R.C., "Automated Rental Vehicle Check-In System," Nov. 3, 2003, U.S. Appl. No. 60/516,931.

* cited by examiner

*Primary Examiner* — Yonel Beaulieu
(74) *Attorney, Agent, or Firm* — Ingrassia Fisher & Lorenz, P.C.

(57) ABSTRACT

A method for initiating a service session with a vehicle includes the steps of receiving a first wireless signal transmitted by the vehicle, establishing an identity of the vehicle from the first wireless signal, associating a privilege with the vehicle based at least in part on the identity, transmitting a second wireless signal to the vehicle with a request for service data of the vehicle if the privilege includes an ability to request the service data from the vehicle, and receiving the service data of the vehicle.

20 Claims, 3 Drawing Sheets

METHODS AND APPARATUS FOR INITIATING SERVICE SESSIONS BETWEEN VEHICLES AND SERVICE PROVIDERS

TECHNICAL FIELD

The technical field generally relates to vehicles, and more particularly relates to methods and systems for initiating vehicle service sessions between vehicles and service providers for vehicles.

BACKGROUND

Automobiles and other vehicles are periodically taken to service providers for various different types of vehicle service sessions including, among others, oil changes, tire rotations, tire replacements, scheduled maintenance, diagnostics, repairs, and/or other vehicle service sessions. As the driver takes the vehicle to the service provider, there may be some time delay as the service provider obtains information regarding the vehicle and as the vehicle service session is initiated.

Accordingly, it is desirable to provide an improved method for a service provider to initiate a service session with a vehicle. It is also desirable to provide an improved method for a vehicle to initiate a service session with a service provider. It is further desirable to provide a system for an apparatus for a vehicle for initiating a service session with a service provider. Furthermore, other desirable features and characteristics will become apparent from the subsequent summary and detailed description and the appended claims, taken in conjunction with the accompanying drawings and this background.

SUMMARY

In accordance with an exemplary embodiment, a method for initiating a service session with a vehicle is provided. The method comprise the steps of receiving a first wireless signal transmitted by the vehicle, establishing an identity of the vehicle from the first wireless signal, associating a privilege with the vehicle based at least in part on the identity, transmitting a second wireless signal to the vehicle with a request for service data of the vehicle if the privilege includes an ability to request the service data from the vehicle, and receiving the service data of the vehicle.

In accordance with another exemplary embodiment, a method for a vehicle to initiate a service session with a service provider is provided. The method comprises the steps of receiving a first wireless signal transmitted by the service provider, establishing an identity of the service provider from the first wireless signal, associating a privilege with the service provider based at least in part on the identity, accepting a second wireless signal with a request for service data of the vehicle if the privilege includes an ability of the service provider to access the service data, gathering the service data, and transmitting a third wireless signal to the service provider with the service data gathered by the vehicle.

In accordance with a further exemplary embodiment, an embedded apparatus for a vehicle for initiating a service session with a service provider is provided. The apparatus comprises a receiver, a processor, and a transmitter. The receiver is adapted to receive a first wireless signal from the service provider. The processor is adapted to establish an identity of the service provider from the first wireless signal, associate a privilege with the service provider based at least in part on the identity, and gather service data of the vehicle if the privilege includes an ability of the service provider to access the service data of the vehicle. The transmitter is adapted to transmit a second wireless signal to the service provider with the service data gathered by the processor. The receiver, the processor, and the receiver are embedded within the vehicle.

BRIEF DESCRIPTION OF THE DRAWINGS

The embodiments hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
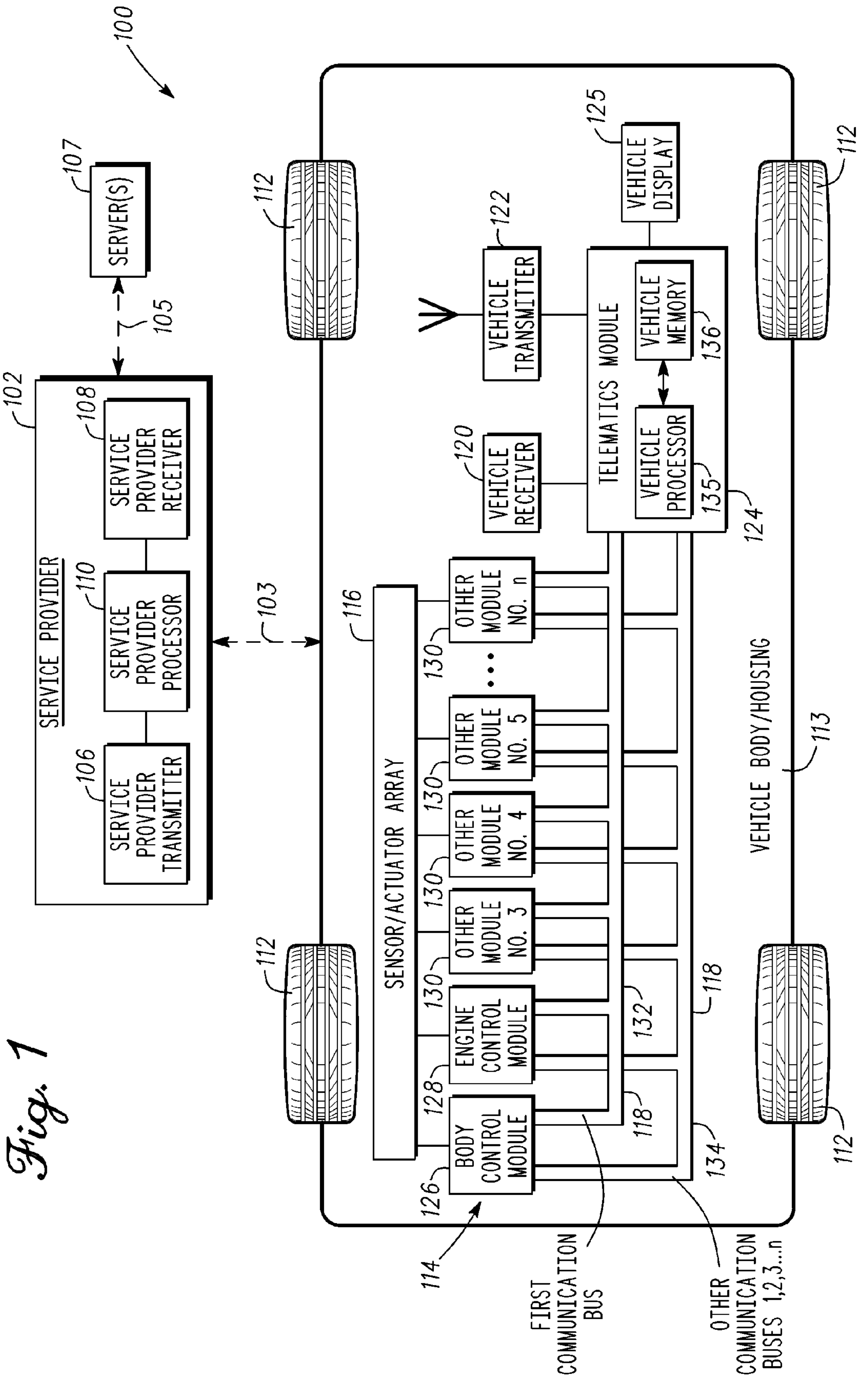
FIG. 1 is a functional block diagram of a vehicle and a vehicle service provider, and including an apparatus for the vehicle for initiating a service session with the vehicle service provider, in accordance with an exemplary embodiment.

FIG. 1 is a functional block diagram of a vehicle 100 and a service provider 102, in accordance with an exemplary embodiment. The vehicle 100 and the service provider 102 are adapted to be coupled to one another via a wireless connection 103 when the vehicle 100 approaches or is otherwise in a relatively close proximity to the service provider 102. For example, in one preferred embodiment, the vehicle 100 and the service provider 102 communicate with one another via the wireless connection 103 when the vehicle 100 is within approximately one hundred meters of the service provider 102. However, this may vary in other embodiments. The wireless connection 103 may also vary in different embodiments. For example, in different embodiments, the wireless connection 103 may comprise a cellular network, a WiFi network, a WiMax network, Bluetooth, and/or any one or more of a number of different types of wireless connections 103.

In one preferred embodiment, the vehicle 100 comprises an automobile. Also in one preferred embodiment, the service provider 102 comprises a facility to which vehicles are taken for various vehicle service sessions, such as oil changes, tire rotations, tire replacements, scheduled maintenance, diagnostics, repairs, new vehicle delivery and/or other vehicle service sessions. In various other embodiments, various other vehicle health verification uses cases may be utilized. For example, various embodiments may be implemented in connection with vehicle health verification use cases at locations that are remote from the vehicle such as, by way of example only, fleet vehicle centers including taxi hubs, police hubs, ports of delivery, vehicle assembly yards, and/or any number of other different use cases. It will be appreciated that the type of vehicle 100 and/or service provider 102 may vary in different embodiments.

In the depicted embodiment, the service provider 102 has a service provider transmitter 106, a service provider receiver 108, and a service provider processor 110. The service provider transmitter 106 transmits various signals to the vehicle 100 along the wireless connection 103 to facilitate the initiation and/or implementation of service sessions for the vehicle 100 by the service provider 102. Specifically, in a preferred embodiment, the service provider transmitter 106 transmits various signals to the vehicle 100 to request information from the vehicle 100, to help the vehicle 100 ascertain the identity of the service provider 102, to provide information to help associate a privilege of the service provider 102, to provide requests from the service provider 102 to the vehicle 100, such as requests for service data from the vehicle 100, welcome messages to be displayed within the vehicle 100, and for remote control of one or more vehicle devices, and to provide service history to the vehicle 100, all in accordance with the process 200 depicted in FIG. 2 and described further below in connection therewith, in accordance with an exemplary embodiment.

The service provider receiver 108 receives various signals from the vehicle 100 to facilitate the initiation and/or implementation of service sessions for the vehicle 100 by the service provider 102. Specifically, in a preferred embodiment, the service provider receiver 108 receives various signals from the vehicle 100 with information as to the identity of the vehicle 100, information to help associate a privilege of the service provider 102, information including and regarding the service data requested by the service provider 102 from the vehicle 100, and information pertaining to the vehicle 100's responses to requests from the service provider 102 to the vehicle 100, such as requests for service data from the vehicle 100, welcome messages to be displayed within the vehicle 100, and for remote control of one or more vehicle devices, all in accordance with the process 200 depicted in FIG. 2 and described further below in connection therewith, in accordance with an exemplary embodiment.

The service provider processor 110 is coupled to the service provider transmitter 106 and to the service provider receiver 108. The service provider processor 110 facilitates the initiation and/or implementation of service sessions for the vehicle 100 by the service provider 102. Specifically, in accordance with a preferred embodiment, the service provider processor 110 receives and processes information from the service provider receiver 108, such as the above-referenced information as to the identity of the vehicle 100, information as to the association of a privilege of the service provider 102, information including and regarding the service data requested by the service provider 102 from the vehicle 100, and information pertaining to the vehicle 100's responses to requests from the service provider 102 to the vehicle 100, all in accordance with the process 200 depicted in FIG. 2 and described further below in connection therewith, in accordance with an exemplary embodiment. In addition, the service provider processor 110 also provides instructions to the service provider transmitter 106 for the transmission of the above-referenced signals to be transmitted from the service provider transmitter 106 to the vehicle 100, such as the above-referenced signals to the vehicle 100 to request information from the vehicle 100, to help the vehicle 100 ascertain the identity of the service provider 102, to provide information to help associate a privilege of the service provider 102, to provide requests from the service provider 102 to the vehicle 100, and to provide service history to the vehicle 100, also in accordance with an exemplary embodiment.

In addition, in the depicted embodiment, the service provider 102 is coupled to one or more servers 107. In certain embodiments, the service provider processor 110 communicates with the one or more servers 107 to obtain information, instructions, and/or recommendations pertaining to the identity of the vehicle 100, the privileges associated with the service provider 102 as they pertain to the vehicle 100, any authentication processes utilized for or between the service provider 102 and the vehicle 100, the service data obtained from the vehicle 100, the implementation of the service data, and/or the services to be provided for the vehicle 100 by the service provider 102, among other possible information, instructions, and/or recommendations to assist with the initiation and/or implementation of service sessions for the vehicle 100 by the service provider 102.

In one preferred embodiment, one or more servers 107 are disposed in a separate location from the service provider 102 and are coupled to the service provider processor 110 via a second connection 105. In one exemplary embodiment, the second connection 105 is also a wireless connection. However, this may vary in other exemplary embodiments.

For example, in such a preferred embodiment, a vehicle manufacturer and/or a group of service providers 102 may utilize one or more common servers 107 that are located off-site from a particular service provider 102. This can provide for enhanced security and/or for more efficient and streamlined modification and upkeep, and can also help to minimize the footprint in each of the service providers 102 for this system and/or reduce the costs for individual service providers 102 who might otherwise be required to purchase additional hardware and infrastructure. In other embodiments, the server 107 is disposed in relatively close proximity to the service provider processor 110, for example in the same building as the service provider processor 110. In yet other embodiments, the service provider processor 110 is part of the server 107. In addition, in still other embodiments, a relatively local server 107 may be used to perform certain tasks or to provide certain types of information, and one or more intermediate and/or relatively distant servers 107 may be used to perform other tasks or to provide other types of information.

Also in the depicted embodiment, the vehicle 100 includes wheels 112, a vehicle body and housing 113, modules 114, a sensor/actuator array 116, a communication bus system 118, a vehicle receiver 120, a vehicle transmitter 122, a telematics module 124, and a vehicle display 125. In a preferred embodiment, the modules 114, the sensor/actuator array 116, the communication bus system 118, the vehicle receiver 120, the vehicle transmitter 122, the telematics module 124, and the vehicle display 125 are each disposed and housed within the vehicle body and housing 113. The number and/or configuration of the wheels 112 and/or other components of the vehicle 100 may vary in other embodiments.

In the depicted embodiment, the plurality of modules 114 includes a body control module 126 for the vehicle 100, an engine control module 128 for the vehicle 100, and any number of other modules 130 for the vehicle 100. Also in the depicted embodiment, the sensor/actuator array 116 is coupled to each of the plurality of modules 114. The sensor/actuator array 116 is adapted to obtain state of health information from each of the plurality of modules 114 and to provide the state of health information to the processor along the communication bus system 118.

The communication bus system 118 may include any number of different communication buses, networks, and/or links for the transmission of information, particularly the above-referenced state of health information, from the sensor/actuator array 116 to the telematics module 124. In the depicted embodiment, the communication bus system 118 comprises a first communication bus 132 and one or more additional communication buses 134 for the vehicle. It will be appreciated that the various communication buses 132, 134 may comprise any number of different types of wired, wireless, low speed, and/or high speed communication buses.

In one preferred embodiment, the first communication bus 132 comprises a relatively low speed communication bus, for example for transporting data or information of a relatively less important or sensitive nature and/or information for which values change relatively slowly. Also in one preferred embodiment, the second first communication bus 134 comprises a relatively high speed communication bus, for example for transporting data or information of a relatively more important or sensitive nature and/or information for which values change relatively quickly. However, this may vary in other embodiments.

The vehicle receiver 120 receives various signals from the service provider 102 pertaining to the initiation and/or implementation of service sessions for the vehicle 100 by the service provider 102. Specifically, in a preferred embodiment, the vehicle receiver 120 receives various signals from the service provider 102 with requests for information from the vehicle 100, with information to help the vehicle 100 ascertain the identity of the service provider 102, information to help associate a privilege of the service provider 102, and with requests from the service provider 102 to the vehicle 100, such as requests for service data from the vehicle 100, welcome messages to be sent to and displayed within the vehicle 100, and for remote control of one or more vehicle devices, and information regarding service history received from the service provider 102, all in accordance with the process 200 depicted in FIG. 2 and described further below in connection therewith, in accordance with an exemplary embodiment.

Also in one preferred embodiment, the vehicle receiver 120 comprises a WiFi receiver and/or transceiver of a flexible compute platform (FCP) for use with a wireless connection 103 comprising a WiFi wireless network. However, this may vary in other embodiments.

The vehicle transmitter 122 transmits, along the wireless connection 103, various signals to the service provider 102 pertaining to the initiation and/or implementation of service sessions for the vehicle 100 by the service provider 102. Specifically, in a preferred embodiment, the vehicle transmitter 122 provides various signals to the service provider 102 with information as to the identity of the vehicle 100, information to help associate a privilege of the service provider 102, information including and regarding the service data requested by the service provider 102 from the vehicle 100, and information pertaining to the vehicle 100's responses to requests from the service provider 102 to the vehicle 100, such as requests for service data from the vehicle 100, welcome messages to be displayed within the vehicle 100, and for remote control of one or more vehicle devices. Also in a preferred embodiment, the vehicle transmitter 122 performs these operations in accordance with the process 200 depicted in FIG. 2 and described further below in connection therewith.

Also in one preferred embodiment, the vehicle transmitter 122 comprises a WiFi transmitter and/or transceiver of a flexible computer platform (FCP) for use with a wireless connection 103 comprising a WiFi wireless network. However, this may vary in other embodiments. For example, in one preferred embodiment, the vehicle receiver 120 and the vehicle transmitter 122 comprise one or more common transceivers. However, this may also vary in other embodiments.

The telematics module 124 is coupled to the sensor/actuator array 116, the vehicle receiver 120, and the vehicle transmitter 122. In the depicted embodiment, the telematics module 124 includes a vehicle processor 135 and a vehicle memory 136. In one preferred embodiment, the telematics module 124 comprises a computer system and/or component of a flexible computer platform (FCP) for use with a wireless connection 103 comprising a WiFi wireless network along with the vehicle receiver 120 and the vehicle transmitter 122. However, this may vary in other embodiments.

In a preferred embodiment, the vehicle processor 135 receives the state of health information from the sensor/actuator array 116 via the communication bus system 118 and processes the state of health information. Also in a preferred embodiment, the vehicle processor 135 thereby gathers and generates service data representative of vehicle 100 health, in accordance with the process 200 depicted in FIG. 2 and described further below in connection therewith, in accordance with an exemplary embodiment.

Figure 2A:
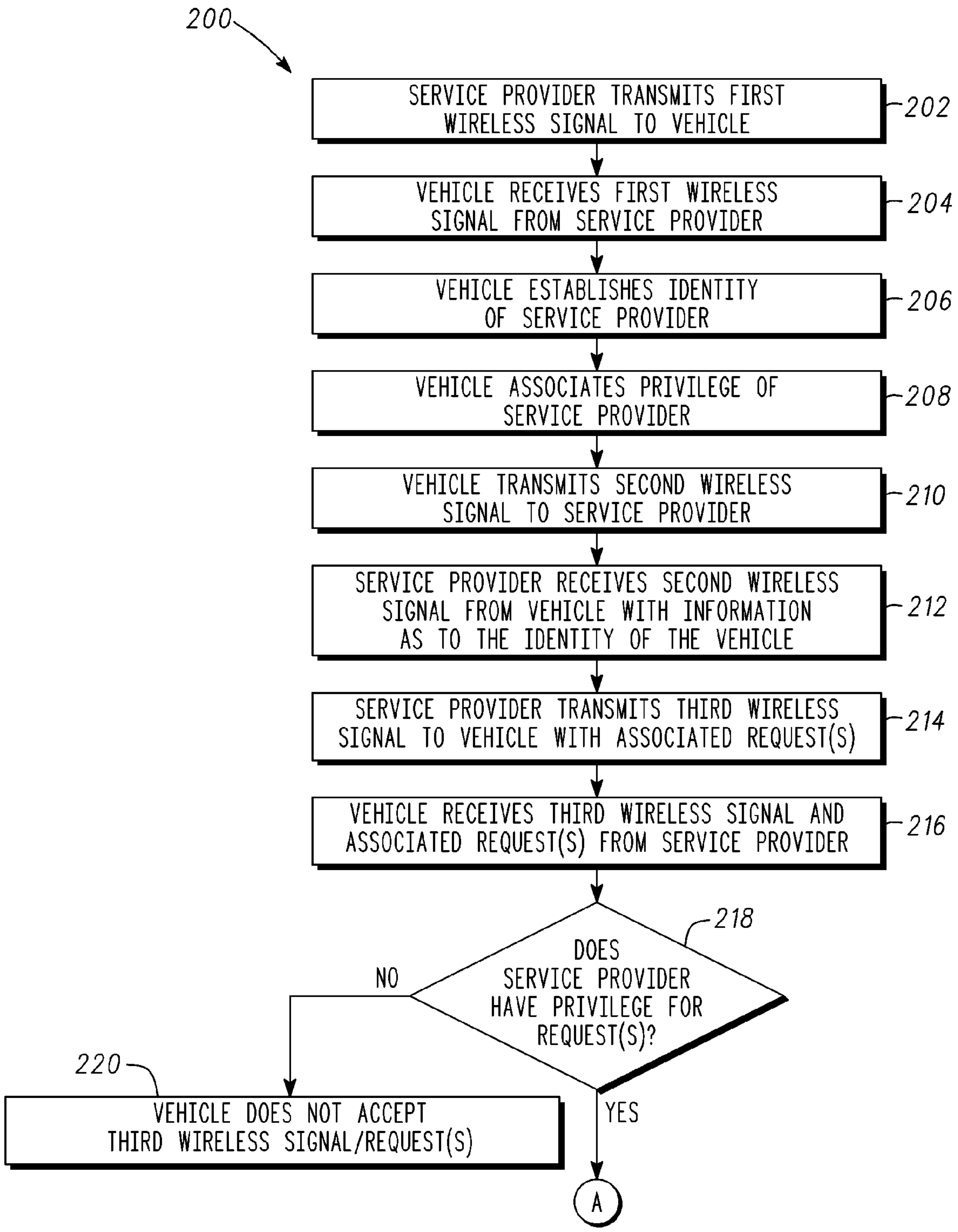
FIG. 2 is a flowchart of a process for an initiation and implementation of a service session between a vehicle and a service provider, and that can be implemented in connection with the vehicle, the vehicle service provider, and the apparatus of FIG. 1, in accordance with an exemplary embodiment.
Figure 2B:
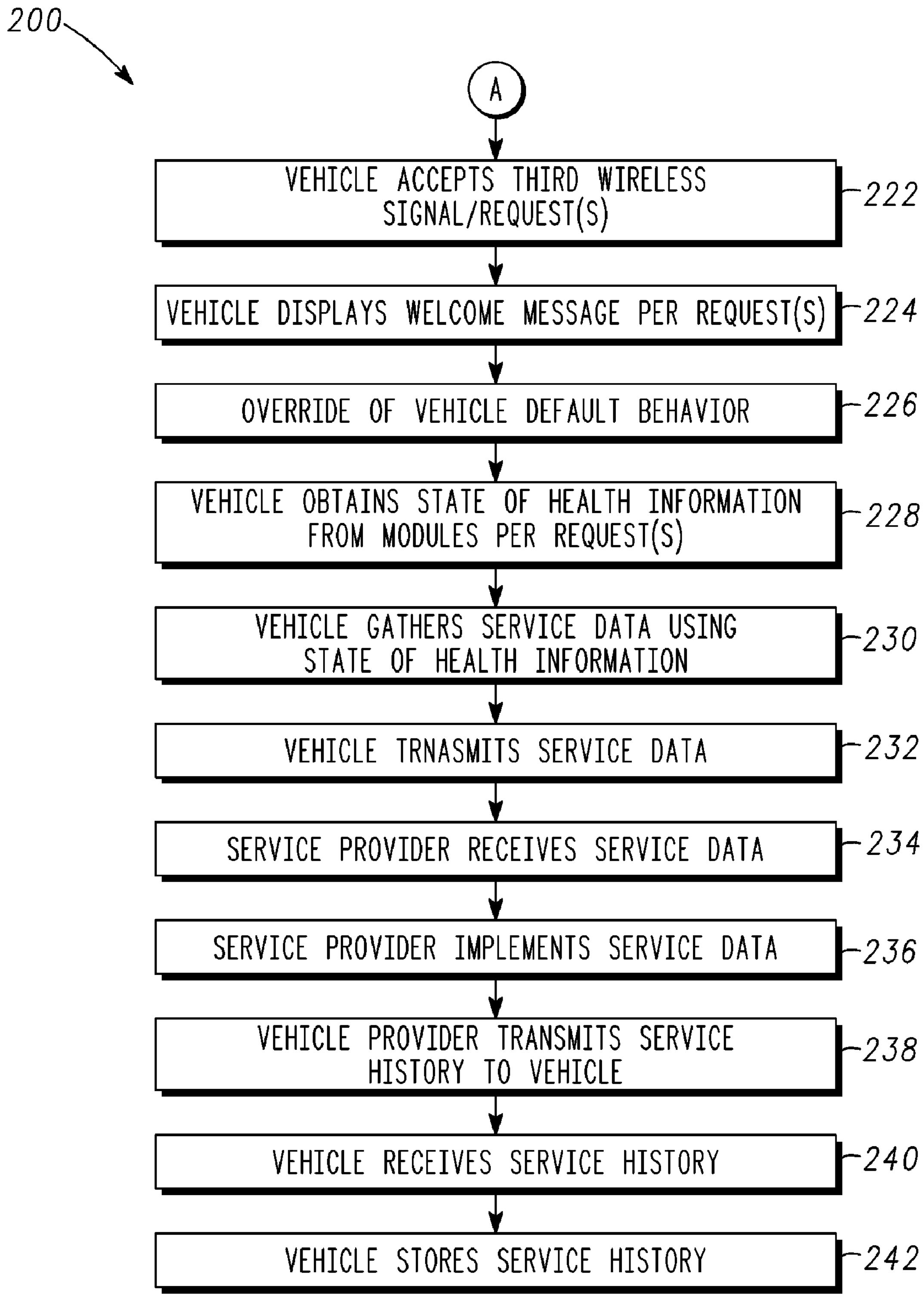

Also in a preferred embodiment, the vehicle processor 135 receives and processes the information and requests from the vehicle receiver 120, including the above-referenced requests for information from the vehicle 100, information to help the vehicle 100 ascertain the identity of the service provider 102, information to help associate a privilege of the service provider 102, information regarding requests from the service provider 102 to the vehicle 100, such as requests for service data from the vehicle 100, welcome messages to be displayed within the vehicle 100, and override of default behavior by actuating one or more vehicle devices or systems, and information regarding service history for the vehicle 100 from the service provider 102, also in accordance with the process 200 depicted in FIG. 2 and described further below in connection therewith, in accordance with an exemplary embodiment.

In addition, also in a preferred embodiment, the vehicle processor 135 also provides instructions to the vehicle transmitter 122 for the transmission of the above-referenced signals to be transmitted from the vehicle 100 to the service provider 102, such as the above-referenced signals to the service provider 102 with information as to the identity of the vehicle 100, information to help associate a privilege of the service provider 102, information including and regarding the service data requested by the service provider 102 from the vehicle 100, and information regarding the vehicle 100's responses to requests from the service provider 102 to the vehicle 100, such as requests for service data from the vehicle 100, welcome messages to be displayed within the vehicle 100, and for remote control of one or more vehicle devices, also in accordance with the process 200 depicted in FIG. 2 and described further below in connection therewith, in accordance with an exemplary embodiment.

The vehicle memory 136 is coupled to the vehicle processor 135. In one preferred embodiment, the vehicle service history received from the service provider 102 by the vehicle receiver 120 is stored in the vehicle memory 136 by the vehicle processor 135 for subsequent retrieval and use by the vehicle processor 135, also in accordance with the process 200 depicted in FIG. 2 and described further below in connection therewith in accordance with an exemplary embodiment.

The vehicle display 125 is also coupled to the vehicle processor 135. In one preferred embodiment, the vehicle display 125 displays a welcome message from the service provider 102 based on instructions provided by the vehicle processor 135 and a welcome message request transmitted from the service provider 102. Also in a preferred embodiment, the welcome message comprises an audio and/or visual message announcing the name of the service provider 102 and welcoming the driver and/or other occupants of the vehicle 100. In various preferred embodiments, the vehicle display

125 may comprise any number of different audio and/or video devices, mechanisms, and/or systems.

FIG. 2 is a flowchart of a process 200 for an initiation and implementation of a service session between a vehicle and a service provider, in accordance with an exemplary embodiment. The process 200 can be implemented in connection with the vehicle 100 of FIG. 1, the service provider 102 of FIG. 1, and the components thereof, also in accordance with an exemplary embodiment.

As depicted in FIG. 2, the process 200 begins with the step of transmitting a first wireless signal to the vehicle (step 202). In a preferred embodiment, the first wireless signal includes information as to the identity of the service provider. In a preferred embodiment, the first wireless signal includes information as to the identity of the service provider 102 of FIG. 1, and is provided by the service provider 102 of FIG. 1 to the vehicle 100 of FIG. 1. Specifically, in a preferred embodiment, the first wireless signal is transmitted by the service provider transmitter 106 of FIG. 1 along the wireless connection 103 of FIG. 1 within a range of approximately 100 meters.

The first wireless signal is then received from the service provider (step 204). In one preferred embodiment, during step 204 the vehicle 100 of FIG. 1 is continually listening for a signal from one or more service providers 102 of FIG. 1 with a specific service provider identifier (SSID) that matches one or more dealership and/or other service provider profiles. However, this may vary in other embodiments.

Also in a preferred embodiment, the first wireless signal is received by the vehicle receiver 120 of FIG. 1, and information representative thereof is provided to the vehicle processor 135 of FIG. 1 for processing. Also in a preferred embodiment, the first wireless signal is received by the vehicle receiver 120 of FIG. 1 when the vehicle 100 of FIG. 1 is within approximately 100 meters of the service provider 102 of FIG. 1. In one preferred embodiment, this represents a first step in the initiation of a service session for the vehicle 100 of FIG. 1.

Also in certain preferred embodiments, various criteria can also be established that will need to be met before the vehicle 100 starts listening looking for service provider identifiers. For example, in certain embodiments, such listening for service provider identifiers may occur only when a WiFi or other wireless service or feature of the vehicle is turned on. As another example, in certain other embodiments, such listening for service provider identifiers may occur only when the vehicle speed is less than a predetermined speed threshold value, such as fifteen miles per hour, by way of example only. In yet other exemplary embodiments, such listening for service provider identifiers may occur only when a SSID profile/format is recognized and/or when the service provider identifier has a signal strength that exceeds a minimum signal strength threshold, among various other possible criteria in various other exemplary embodiments. In addition, in certain embodiments, data from a global positioning system (GPS) may be utilized in order to ascertain a distance between the vehicle and the service provider to further facilitate the initiation of the service session and/or the decision of the vehicle as to whether to listen for and/or recognize the service center identifier.

An identity of the service provider is then established (step 206). In a preferred embodiment, the identity of the service provider 102 is established by the vehicle processor 135 of FIG. 1 by processing the information received during the above-described step 204. For example, in one preferred embodiment, the identity of the service provider includes information as to the name, type, and address of the service provider 102 of FIG. 1.

In addition, one or more privileges are associated with the service provider (step 208). In a preferred embodiment, the one or more privileges include one or more types of requests that may be made by the service provider and/or that the vehicle is authorized to accept or comply with respect to a particular service provider. For example, in certain preferred embodiments, the vehicle will have or allow different available functionality depending upon the type of service provider and/or access point it is hooking up to (for example, if it hooks up to a home access point it will have certain capabilities, while if it hooks up to a dealership access point it may have different capabilities, in certain embodiments).

Also in a preferred embodiment, the one or more privileges include various types of service data and/or other information that may be requested from the vehicle 100 of FIG. 1 by the service provider 102 of FIG. 1, one or more requests for overriding default behavior of vehicle devices or systems (such as flashing of vehicle lights, honking of vehicle horns, and/or other such remote control of vehicle devices that can be used to identify the vehicle 100 of FIG. 1 to one or more representatives of the service provider 102 of FIG. 1), and/or one or more requests to display a welcome message from the service provider 102 of FIG. 1 for the driver and/or other occupants of the vehicle 100 of FIG. 1, and/or requests for performing vehicle tests, diagnosis, evaluation and analysis, among other possible requests. In addition, in a preferred embodiment, the service provider privileges are associated by the vehicle processor 135 of FIG. 1 using the identification of the service provider 102 of FIG. 1 in step 206 above.

Also in a preferred embodiment, security measures are taken to ensure that the identity of the service provider 102 of FIG. 1 and the privileges associated with the service provider 102 are legitimate and accurate. For example, in one preferred embodiment, the vehicle 100 of FIG. 1 conducts a discovery and authentication process with an authentication, authorization, and accounting ("AAA") server to help ensure that the identity of the service provider 102 and that the privileges associated with the service provider 102 are legitimate and accurate. In one preferred embodiment, the authentication process includes a certificate exchange, in which a certificate of the vehicle 100 is verified by the AAA server and the credentials/certificate of the service provider 102 are also processed through a discovery and authentication process and verified by the AAA server. The vehicle 100 also preferably verifies the credentials of the service provider 102 and/or any network affiliated with the service provider 102 and uses these credentials to confirm this is a valid access point/dealership or other service provider 102 for the vehicle to connect to. In one preferred embodiment, the AAA server corresponds to one or more servers 107 of FIG. 1. Also in one preferred embodiment, an authentication process and/or system similar to those described in the co-pending, commonly assigned U.S. patent application Ser. No. 11/678,082 (Alrabady, Publication No. US2008/0204191A1) are utilized. However, this may vary in other embodiments.

A second wireless signal is transmitted to the service provider (step 210). In a preferred embodiment, the second wireless signal includes information as to the identity of the vehicle. In a preferred embodiment, the second wireless signal includes information as to the identity of the vehicle 100 of FIG. 1, and is provided by the vehicle 100 of FIG. 1 to the service provider 102 of FIG. 1. Specifically, in a preferred embodiment, the second wireless signal is transmitted by the vehicle transmitter 122 of FIG. 1 along the wireless connection 103 of FIG. 1 within a range of approximately 100 meters.

The second wireless signal is then received from the vehicle (step 212). In one preferred embodiment, during step 210 the service provider 102 of FIG. 1 is continually listening for a signal from one or more vehicles of FIG. 1 with a specific vehicle identifier that matches one or more vehicle profiles. However, this may vary in other embodiments.

In a preferred embodiment, the second wireless signal is received by the service provider receiver 108 of FIG. 1, and information representative thereof is provided to the service provider processor 110 of FIG. 1 for processing. Also in a preferred embodiment, the second wireless signal is received by the service provider receiver 108 when the vehicle 100 of FIG. 1 is within approximately 100 meters of the service provider 102 of FIG. 1, and is transmitted and received in response to the first wireless signal of the above-described steps 202 and 204.

A third wireless signal is then transmitted to the vehicle along with various requests (step 214). In a preferred embodiment, the requests include one or more requests for remote control of vehicle devices (such as flashing of vehicle lights, honking of vehicle horns, and/or other such remote control of vehicle devices that can be used to identify the vehicle 100 of FIG. 1 to one or more representatives of the service provider 102 of FIG. 1), and/or one or more requests to display a welcome message from the service provider 102 of FIG. 1 for the driver and/or other occupants of the vehicle 100 of FIG. 1, and/or requests for performing vehicle tests, diagnosis, evaluation and analysis, among other possible requests. Also in a preferred embodiment, the third wireless signal is provided by the service provider 102 of FIG. 1 to the vehicle 100 of FIG. 1. Specifically, in a preferred embodiment, the third wireless signal is transmitted by the service provider transmitter 106 of FIG. 1 along the wireless connection 103 of FIG. 1 within a range of approximately 100 meters in response to the second wireless request of the above-described steps 210 and 212.

The third wireless signal and the associated requests are then received from the service provider (step 216). In a preferred embodiment, the third wireless signal and the associated requests are received by the vehicle receiver 120 of FIG. 1, and information representative thereof is provided to the vehicle processor 135 of FIG. 1 for processing. Also in a preferred embodiment, the third wireless signal and associated requests are received by the vehicle receiver 120 of FIG. 1 when the vehicle 100 of FIG. 1 is within approximately 100 meters of the service provider 102 of FIG. 1, and are transmitted and received in response to the second wireless request of the above-described steps 210 and 212.

A determination is then made as to whether the service provider has the privileges associated with the requests accompanying the third wireless signal of steps 214 and 216 (step 218). In a preferred embodiment, this determination is made by the vehicle processor 135 of FIG. 1 with respect to the service provider 102 of FIG. 1, using the associated privilege information of the above-described step 208.

If it is determined that the service provider does not have the privileges associated with one or more of the requests accompanying the third wireless signal of steps 214 and 216, then such requests, and/or the third wireless signal pertaining thereto, are not accepted by the vehicle (step 220).

Conversely, If it is determined that the service provider does have the privileges associated with the requests accompanying the third wireless signal of steps 214 and 216, then such requests, and/or the third wireless signal pertaining thereto, are accepted by the vehicle (step 222). In a preferred embodiment, this acceptance is made by the vehicle processor 135 of FIG. 1.

A welcome message is then displayed (step 224). In a preferred embodiment, the welcome message is displayed for the driver and/or occupants of the vehicle pursuant to one of the requests from the service provider of the above-described steps 214 and 216. Also in a preferred embodiment, the welcome message is displayed on or by the vehicle display 125 of FIG. 1 pursuant to instructions from the vehicle processor 135 of FIG. 1 in implementing the welcome message request from the service provider 102 of FIG. 1. Also in a preferred embodiment, the welcome message comprises an audio and/or visual message announcing the name of the service provider 102 of FIG. 1 and welcoming the driver and/or other occupants of the vehicle 100 of FIG. 1.

In addition, override of the default behavior of one or more vehicle devices is allowed by the vehicle and performed by the service provider (step 226). In a preferred embodiment, the remote control of the vehicle devices is allowed by the vehicle 100 and performed by the service provider 102 pursuant to one of the requests from the service provider of the above-described steps 214 and 216. Also in one preferred embodiment, the remote control of the vehicle devices comprises one or more commands such as the flashing of vehicle lights, the honking of a vehicle horn, and/or any number of other such remote control of vehicle devices that can be used to identify the vehicle 100 of FIG. 1 to one or more representatives of the service provider 102 of FIG. 1.

State of health information is then obtained from various modules of the vehicle (step 228). In a preferred embodiment, information derived from the vehicle computing network regarding the state of health of each of the body control module 126, the engine control module 128, and the other modules 130 of FIG. 1 is obtained by the sensor and actuator array 116 of FIG. 1, and signals and information pertaining thereto are transported via the communication bus system 118 of FIG. 1 to the vehicle processor 135 of FIG. 1 for processing. In addition, in one preferred embodiment, the state of health information is obtained by the sensor and actuator array 116 of FIG. 1, based on instructions provided thereto by the vehicle processor 135 over the communication bus system 118 of FIG. 1 in implementing the requests for service data made by the service provider 102 of FIG. 1 following authentication of the privileges of the service provider 102 pertaining to such requests.

The service data is then gathered (step 230). In a preferred embodiment, the service data represents one or more measures of a state of health of the vehicle 100 of FIG. 1 and/or one or more modules 114 of FIG. 1 and/or groups thereof. The data contained within the state of health of the vehicle may contain but is not limit to diagnostic trouble codes, associated freeze frame failure records, vehicle parametric data, and data responses from the remote override of actuators. For example, in certain preferred embodiments, the service data also comprises one or more of the following: a vehicle identification number (VIN) for the vehicle 100 of FIG. 1, an odometer reading for the vehicle 100, a time stamp (for example, that indicates when the service data was retrieved from the vehicle 100), diagnostic trouble codes, associated freeze frame failure records, vehicle parametric data for the vehicle 100, and data responses from the remote override of actuators of the vehicle 100. Examples include odometer readings for the vehicle 100, fuel information (for example, that indicates a current level of fuel volume and a fuel level percentage in the vehicle 100), tire information (for example, that indicates a tire pressure for each of the tires of the vehicle 100), oil life information (for example, that indicates a percentage oil life remaining for the vehicle 100), battery information (for example, State of Health and State of charge for the battery of the vehicle 100), transmission Oil Life of the vehicle 100, among various possible types of information.

Also in a preferred embodiment, the service data is gathered and/or generated using the state of health information obtained in the above-described step 228. Specifically, in one preferred embodiment, the service data is gathered and/or generated by the vehicle processor 135 of FIG. 1 using the state of health information obtained by the sensor/actuator array 116 of FIG. 1 in the above-described step 228.

The service data is then transmitted to the service provider (step 232). In a preferred embodiment, the service data is transmitted by the vehicle transmitter 122 of FIG. 1 to the service provider receiver 108 of FIG. 1 via the wireless connection 103 in accordance with instructions provided by the vehicle processor 135 of FIG. 1.

The service data is then received (step 234) and implemented (step 236). In a preferred embodiment, the service data is received by the service provider receiver 108 of FIG. 1 and implemented by the service provider processor 110 of FIG. 1. Also in a preferred embodiment, the service provider processor 110 of FIG. 1 implements the service data by issuing instructions for performing examinations, diagnostics, maintenance, and/or repairs on or for the vehicle 100 of FIG. 1 as appropriate based on the service data and/or based on information and/or recommendations provided by the server 107 of FIG. 1 using the service data. A service session is implemented accordingly for the vehicle 100 of FIG. 1 by the service provider 102 of FIG. 1. By way of example only, an oil change may be performed on the vehicle 100 of FIG. 1 if the service data indicates that an oil change is needed. By way of another example, a tire rotation may be performed on the vehicle 100 of FIG. 1 if the service data indicates that a tire rotation is needed. Similarly, any one or more of a number of different types of examinations, diagnostics, and/or services may be provided for the vehicle 100 of FIG. 1 by the service provider 102 of FIG. 1 based at least in part on the service data received in step 234 and implemented in step 236.

A service history of the vehicle is then transmitted to the vehicle (step 238). In a preferred embodiment, the service history includes a record of the services performed as part of the service session of the above-described step 236 and/or the notes and/or results of any such services (for example, the type and amount of oil used for an oil change, a record of the rotation of the tires, a reading of the tire pressure of each of the tires, notes from any examination of the vehicle, and/or various other service notes, records, and/or results). Also in a preferred embodiment, the service history of the vehicle 100 of FIG. 1 is transmitted by the service provider transmitter 106 to the vehicle 100 of FIG. 1 along the wireless connection 103 of FIG. 1.

The service history is then received by the vehicle (step 240). In a preferred embodiment, the service history is received by the vehicle receiver 120 of FIG. 1 and provided to the vehicle processor 135 of FIG. 1. The service history is then stored in the vehicle (step 242). In a preferred embodiment, the service history is stored in the vehicle memory 136 of FIG. 1 by the vehicle processor 135 of FIG. 1 for subsequent retrieval and processing by the vehicle processor 135.

Accordingly, improved methods and apparatus are provided for a service provider to initiate a service session with a vehicle. In addition, improved methods and apparatus are also provided for a vehicle to initiate a service session with a service provider. The disclosed methods and apparatus provide for improved communications between vehicles and service providers and for improved initiation and implementation of service sessions for the vehicles by the service providers. For example, the disclosed methods and apparatus provide for a more convenient, prompt, and efficient initiation of such service sessions, vehicle delivery sessions at time of sale, and other logistic applications at fleet depots such as taxi hubs, police hubs and others. In addition, the disclosed methods and apparatus provide for improved identification and security for the vehicle and the service provider pertaining to the service sessions and various requests and/or services that may be made or provided in connection therewith, among other potential benefits of the disclosed methods and apparatus.

It will be appreciated that the disclosed methods and apparatus may vary from those depicted in the Figures and described herein. For example, as mentioned above, the vehicle 100 of FIG. 1, the service provider 102 of FIG. 1, and/or apparatus and/or components thereof may vary in different embodiments. In addition, it will be appreciated that certain steps of the process 200 may vary from those depicted in FIG. 2 and/or described herein in connection therewith. It will also be appreciated that certain steps of the process 200 may occur simultaneously or in a different order than that depicted in FIG. 2 and/or described herein in connection therewith. It will similarly be appreciated that the disclosed methods and apparatus may be implemented and/or utilized in connection with any number of different types of automobiles, sedans, sport utility vehicles, trucks, and/or any of a number of other different types of vehicles and/or service providers.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method for initiating a service session with a vehicle in proximity to a service provider, comprising the steps of:
   - transmitting a first wireless signal from the service provider to the vehicle, the first wireless signal including information as to an identity of the service provider;
   - receiving, at the service provider, a second wireless signal transmitted by the vehicle in response to the first wireless signal, the second wireless signal including information as to an identity of the vehicle;
   - transmitting, in response to the second wireless signal, a third wireless signal from the service provider to the vehicle with a request from the service provider for service data of the; and
   - receiving the service data of the vehicle.

2. The method of claim 1, wherein the transmission of the first wireless signal, the second wireless signal, and the third wireless signal each have a transmission range of less than about one hundred meters.

3. The method of claim 1, wherein the service data comprises state of health data for the vehicle.

4. The method of claim 1, further comprising the step of: transmitting a request to display a welcome message for an occupant of the vehicle along with the third wireless signal.

5. The method of claim 1, further comprising the step of: transmitting a request to override a default behavior of an actuator or device of the vehicle along with the third wireless signal.

6. The method of claim 1, further comprising the step of: transmitting, in response to the third wireless signal, a fifth wireless signal from the vehicle to the service provider with a service history for the vehicle.

7. A method for a vehicle to initiate a service session with a service provider in proximity to the vehicle, comprising the steps of:

receiving, at the vehicle, a first wireless signal transmitted by the service provider, the first wireless signal including information as to an identity of the service provider;

establishing, on the vehicle, the identity of the service provider from the first wireless signal;

associating, on the vehicle, a privilege with the service provider based at least in part on the identity;

transmitting, from the vehicle to the service provider, a second wireless signal in response to the first wireless signal, the second wireless signal including information as to an identity of the vehicle;

accepting a third wireless signal transmitted from the service provider to the vehicle in response to the second wireless signal, the third wireless signal including a request for service data of the vehicle if the privilege includes an ability of the service provider to access the service data;

gathering the service data on the vehicle if the third wireless signal is accepted; and transmitting a fourth wireless signal from the vehicle to the service provider with the service data gathered by the vehicle in response to the third wireless signal.

8. The method of claim 7, wherein:

the step of gathering the service data comprises the step of gathering the service data on a condition that the third wireless signal is accepted; and the step of transmitting the fourth wireless signal comprises the step of transmitting the fourth wireless signal to the service provider with the service data gathered by the vehicle on the condition that the third wireless signal is accepted.

9. The method of claim 7, wherein the service data comprises state of health data for the vehicle.

10. The method of claim 7, further comprising the step of: displaying a welcome message for an occupant of the vehicle after establishing the identity of the service provider.

11. The method of claim 7, further comprising the step of: allowing the service provider to override a default behavior of an actuator or device of the vehicle along with the third wireless signal.

12. The method of claim 7, further comprising the step of: receiving a fifth wireless signal from the service provider with a service history for the vehicle.

13. An embedded apparatus of a vehicle for initiating a service session with a service provider in proximity to the vehicle, the embedded apparatus comprising:

a receiver embedded within the vehicle and adapted to receive a first wireless signal transmitted from the service provider, the first wireless signal including information as to an identity of the service provider;

a processor within the vehicle and adapted to:

establish an identity of the service provider from the first wireless signal;

associate a privilege with the service provider based at least in part on the identity; and gather service data of the vehicle if the privilege includes an ability of the service provider to access the service data of the vehicle; and a transmitter embedded within the vehicle and adapted to transmit a second wireless signal to the service provider in response to the first wireless signal with information as to an identity of the vehicle, wherein:

the receiver is further configured to receive a third wireless signal transmitted from the service provider to the vehicle in response to the second wireless signal, the third wireless signal including a request for service data of the vehicle if the privilege includes an ability of the service provider to access the service data gathering the service data; and the transmitter is further configured to transmit a fourth wireless signal from the vehicle to the service provider with the service data gathered by the processor in response to the third wireless signal.

14. The embedded apparatus of claim 13, further comprising:

a housing;

wherein the receiver, the processor, and the transmitter are each disposed within the housing.

15. The embedded apparatus of claim 14, wherein the vehicle comprises a plurality of modules, and the embedded apparatus further comprises:

a sensor array and an actuator array disposed within the housing and adapted to obtain state of health information from the plurality of modules of the vehicle and to provide the state of health information to the processor;

wherein the processor is adapted to gather the service data using the state of health information.

16. The embedded apparatus of claim 15, further comprising:

a plurality of communication buses disposed within the housing and adapted to facilitate transport of the state of health information from the sensor array and the actuator array to the processor.

17. The embedded apparatus of claim 13, further comprising:

a display, an audio system, or both, coupled to the processor and adapted to provide a textual welcome message and audio message for an occupant of the vehicle after the identity of the service provider is established.

18. The embedded apparatus of claim 13, wherein the processor is adapted to allow the service provider to override a default behavior of an actuator or device of the vehicle upon request from the service provider after the identity of the service provider is established.

19. The embedded apparatus of claim 13, wherein the receiver is adapted to receive a fifth wireless signal from the service provider with a service history for the vehicle, and the embedded apparatus further comprises a memory configured to store the service history for the vehicle.

20. The method of claim 1, further comprising the step of:

determining, at the vehicle, a privilege associated with the service provider based on the identity of the service provider as obtained via the first wireless signal;

wherein the requested service data is provided from the vehicle to the service provider via a fourth wireless signal transmitted from the vehicle to the service provider, provided that the privilege associated with the service provider corresponds to the service data requested via the third data signal.

* * * * *